United States Patent [19]
Ploetz, deceased et al.

[11] 3,998,730
[45] Dec. 21, 1976

[54] METHOD OF PURIFYING WASTE WATER

[75] Inventors: Theodor Ploetz, deceased, late of Ratingen, Germany, by Adelbert Hasse, administrator; Ursula Haupt; Edeltraud Solich, both of Viersen, all of Germany

[73] Assignee: Feldmuhle Anlagen- und Produktionsgesellschaft mit beschrankter Haftung, Duesseldorf-Oberkassel, Germany

[22] Filed: Oct. 16, 1975

[21] Appl. No.: 622,957

[30] Foreign Application Priority Data

Oct. 19, 1974 Germany ........................ 2449500

[52] U.S. Cl. .................................. 210/28; 210/40; 162/29
[51] Int. Cl.$^2$ ........................................ B01D 15/00
[58] Field of Search ................. 210/28, 30, 32, 33, 210/39, 40; 162/29; 252/463, 420; 423/626–628

[56] References Cited

UNITED STATES PATENTS

| 3,429,660 | 2/1959 | Keith et al. | 423/627 |
| 3,468,625 | 9/1969 | Nightingale et al. | 423/628 |
| 3,625,886 | 12/1971 | Mattia | 210/40 |
| 3,763,040 | 10/1973 | Timpe et al. | 210/40 |
| 3,853,789 | 12/1974 | Warthern et al. | 252/463 |

Primary Examiner—Charles N. Hart
Assistant Examiner—Benoit Castel
Attorney, Agent, or Firm—Hans Berman

[57] ABSTRACT

The dissolution and loss of granular γ-alumina in acidic water contacted with the alumina for purification from lignin and its derivatives can be reduced or eliminated by adding to the acidic waste water an aluminum salt of mineral acid. A flocculate of aluminum hydroxide having the impurities adsorbed thereon is formed on the granular aluminum oxide, and is converted to γ-alumina when the granular material is calcined in air for combustion of the organic waste material.

6 Claims, No Drawings

METHOD OF PURIFYING WASTE WATER

This invention relates to the purification of waste water from lignin and its derivatives formed during the manufacture and processing of wood pulp, and particularly to an improvement in the purification of such waste water by contact with granular γ-alumina at a pH not greater than 7.

It is known from the commonly owned U.S. patent application Ser. No. 566,939, filed on Apr. 10, 1975, that the waste water of paper mills and other plants containing lignin and its derivatives is purified by contact with granular γ-alumina most effectively at a pH near 2.5. In the application of the earlier method on an industrial scale, it was found that enough of the γ-alumina dissolves in the purified water significantly to affect the cost of the water treatment. While the amounts of dissolved alumina may be only of the order of milligrams per cubic meter of treated water, depending on the pH, the volume of waste water to be treated prior to release into streams or lakes from a wood pulp manufacturing or processing plant is very large, and the cost of γ-alumina having the necessary surface properties is relatively high.

It has now been found that the loss of γ-alumina into the purified water can be reduced sharply by mixing aluminum ions with the water prior to contact with the γ-alumina at a pH not greater than 7 at which the aluminum ions are soluble in the water, that is, a pH value at which a precipitate of aluminum hydroxide would form from the admixed aluminum ions is to be avoided.

It is known that freshly precipitated aluminum hydroxide can cause flocculation of lignin and its derivatives having a molecular weight of 6,000 or more, particularly of lignin sulfonates present not only in the waste water from the sulfite cooking of wood chips, but also in the waste water discharged from chlorination and other bleaching operations employed for further purification of the pulp by oxidation of impurities. If waste water carrying an insoluble, aluminum-bearing flocculate is contacted with γ-alumina, very little of the flocculate is adsorbed by the granular oxide, but a fixed bed of granular γ-alumina may filter the flocculate from the waste water in a manner to cause relatively rapid clogging of the bed. Such clogging is not observed with the method of the invention although aluminum lignosulfonate can be detected as a precipitate on the particles of a bed of granular γ-alumina over which waste water containing dissolved aluminum ions was passed.

While the exact mechanism underlying the method of this invention is not yet fully elucidated, it is believed that an acidic waste water dissolves some aluminum ions from granular γ-alumina upon contact, and that the aluminum ions are instrumental in causing adsorption of acidic waste products by the granular γ-alumina. Waste products such as lignosulfonic acid and carboxylic acids are formed by oxidation of lignosulfonic acid and of other lignin derivatives and account for much of the biochemical oxygen demand of the waste water, commonly determined by titration of the acidic or acidified liquid with potassium permanganate solution and expressed in mg $KMnO_4$ per unit volume. When aluminum ions are added to the waste water prior to contact with the γ-alumina, the capacity of the latter for removing impurities from the waste water is enhanced, and its dissolution is repressed.

It has been observed that the necessary time of contact between waste water and γ-alumina for producing a predetermined reduction in B.O.D. (biochemical oxygen demand) is reduced under otherwise identical conditions when a small amount of aluminum ions, preferably 0.03 – 0.05 g per 1000 mg $KMnO_4$, is added to the raw water. It has also been observed that the removal of polysaccharides from the waste water is improved by the aluminum ion addition. These observations are consistent with the hypothesis that, in an initial stage of the earlier purification process, aluminum ions are formed in the treated material from the γ-alumina, and that this stage is eliminated by the addition of aluminum ions to the raw waste water.

The aluminum ions are mixed with the waste water preferably in the form of the aluminum salts of acids strong enough to lower the pH of the waste water. Aluminum sulfate, aluminum chloride, and potassium aluminum sulfate (alum) are preferred because of their low cost, but the anions associated with the aluminum cations are not of major significance in the method of the invention. Sodium aluminate has been employed as a source of aluminum ions with waste waters acidic enough to dissolve the aluminate without precipitation of aluminum hydroxide.

An aluminum-bearing precipitate is formed on the granular γ-alumina from the added aluminum ions and is converted to γ-alumina during conventional regeneration of spent adsorbent at 500° – 650° C to compensate for unavoidable losses of the granular material by abrasion during handling and the like. The calcined precipitate becomes an integral part of the alumina particle on which it was deposited from the waste water.

The waste water purified by this method may still contain formic acid, acetic acid, and monosaccharides which are readily decomposed by conventional exposure to microorganisms. For this purpose, the purified water should be approximately neutral, a pH value of 6 – 7 being preferred. It has been found that the purification method of this invention shifts the pH value of acidic waste water from paper or pulp mills by approximately 1 to 1.5 pH units toward 7 so that an effluent of the preferred, almost neutral reaction is obtained from a raw water having a pH of 4.5 to 5.5. If the waste water initially is less acidic, its pH should be lowered by the addition of aluminum ions in the form of their strong acid salts. If the raw water is alkaline or approximately neutral, the addition of free mineral acid may be necessary, the choice of the acid being controlled by cost and availability.

The equipment employed in performing the method of the invention is too well known to require detailed description, and has been discussed more fully in the afore-mentioned application. It is generally most economical to pass the waste water bearing aluminum ions sequentially through several beds of granular alumina, to regenerate the alumina in the bed receiving the raw water when exhausted, and to place the freshly regenerated bed in contact with the water having passed all other beds so that the water and the γ-alumina move countercurrent through the purification system.

The following examples are further illustrative of the invention.

EXAMPLE 1

The waste water to be treated was discharged from the bleaching (chlorination) stage of a cellulose factory employing the sulfite process. In the process, wood chips were cooked with sodium sulfite to solubilize most of the lignin present in the form of lignosulfonic acid, the lignin-bearing cooking liquor was evaporated to dryness, and the residue was burnt. The pulp stripped of much lignin still contained some lignosulfonic acid, other lignin derivatives of undetermined chemical composition, and polysaccharides, and was brownish. It was bleached by chlorination in an aqueous medium and additional lignosulfonic acid, its oxidation and chlorination products, and oxidation and chlorination products of other lignin derivatives were separated with the aqueous liquor from the bleached chips essentially consisting of cellulose.

The liquor discharged as waste water had a pH of 4.9 and a B.O.D. of 2,260 mg/l due mainly to lignin derivatives and to carbohydrates of high molecular weight. Acetic and formic acid also were identified in the liquid.

The waste water was mixed with 0.7 g aluminum sulfate (technical grade) per liter, and the liquid mixture so obtained had a pH of 4.0. It was passed sequentially over two columns containing each γ-alumina of 1 to 3 mm grain size in a bed about 1.5 m high. The liquid flowed through the columns at a velocity of 4 m per hour so that the average contact time of the water with the adsorbent was 42 minutes.

The capacity of the alumina for removing all detectable lignin derivatives was exhausted by passage of 194 liters waste water per kg alumina, that is, 5.2 kg alumina were needed for purifying one cubic meter of the raw water. The effluent had a pH of 6.5 and a residual B.O.D. of 85 mg $KMnO_4$ per liter due to compounds readily decomposed by microorganisms and essentially consisting of formic acid, acetic acid, and monosaccharides. The weight loss of the spent alumina due to combustion of organic matter during regeneration amounted to 140 g per kg alumina.

EXAMPLE 2

Waste water discharged from a pressboard factory was purified by flocculation and microbial treatment in a conventional manner. It still had a B.O.D. of 580 mg/l and was very dark. 0.35 g Aluminum sulfate per liter was dissolved in the waste water which thereafter had a pH of 4.4. The waste water carrying aluminum ions was passed sequentially over four columns originally packed with granular γ-alumina of 80 – 100 μm particle size to a combined height of 5.50 m. The waste water flowed upward in each column at a rate of 4 m per hour whereby the alumina charge was suspended in the liquid, and the four beds were expanded to a combined height of 11 m. Based on the settled alumina charge, the average contact time between the waste water and the adsorbent was 82 minutes.

When kept in contact with the waste water until exhausted, each kilogram of aluminum oxide (γ-alumina) purified 42 liters waste water. The purified effluent had a pH of 5.9 and a residual B.O.D. of 79 mg/l. It was colorless, free from detectable amounts of lignin derivatives, and its B.O.D. was due entirely to small amounts of acetic acid, formic acid, and monosaccharides.

The alkaline processes for the digestion of wood (soda process, kraft process) discharge waste waters much lower in contaminants than the sulfite process, and lignosulfonic acid is not a predominant constituent. Still, preliminary tests indicate that the waste waters from the alkaline processes can be purified effectively by contact with γ-alumina to reduce their B.O.D., and that the efficiency and economy of the purification process can be enhanced by the addition of aluminum ions to the acidic raw water prior to alumina treatment in a manner basically analogous to the treatment of the waste water from the bleaching stage of a sulfite pulp mill.

It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A method of purifying waste water contaminated by at least one member of the group consisting of lignin and the products of sulfonation, chlorination, and oxidation of lignin, which comprises:
   a. dissolving in said waste water at a pH value not greater than 7 an aluminum salt as a source of aluminum ions;
   b. thereafter contacting the aqueous solution so produced with granular γ-alumina until said at least one member is adsorbed by said alumina as a water-insoluble precipitate; and
   c. separating the water thereby purified from the alumina carrying said precipitate, the amount of said aluminum ions being sufficient to repress dissolution of said γ-alumina in said aqueous solution.

2. A method as set forth in claim 1, wherein said pH value is between 3.5 and 7.

3. A method as set forth in claim 1, wherein said at least one member has a molecular weight of at least 6,000.

4. A method as set forth in claim 1, wherein said salt lowers the pH of said waste water when being dissolved therein.

5. A method as set forth in claim 1, wherein a sample of said waste water when acidified prior to said contacting is capable of consuming an amount of potassium permanganate commensurate with the biochemical oxygen demand of said at least one member, said aluminum salt providing 0.03 to 0.05 g aluminum ions per 1000 mg potassium permanganate capable of being consumed by said waste water.

6. A method as set forth in claim 1, wherein said aluminum salt is aluminum sulfate, aluminum chloride, or alum.

* * * * *